UNITED STATES PATENT OFFICE.

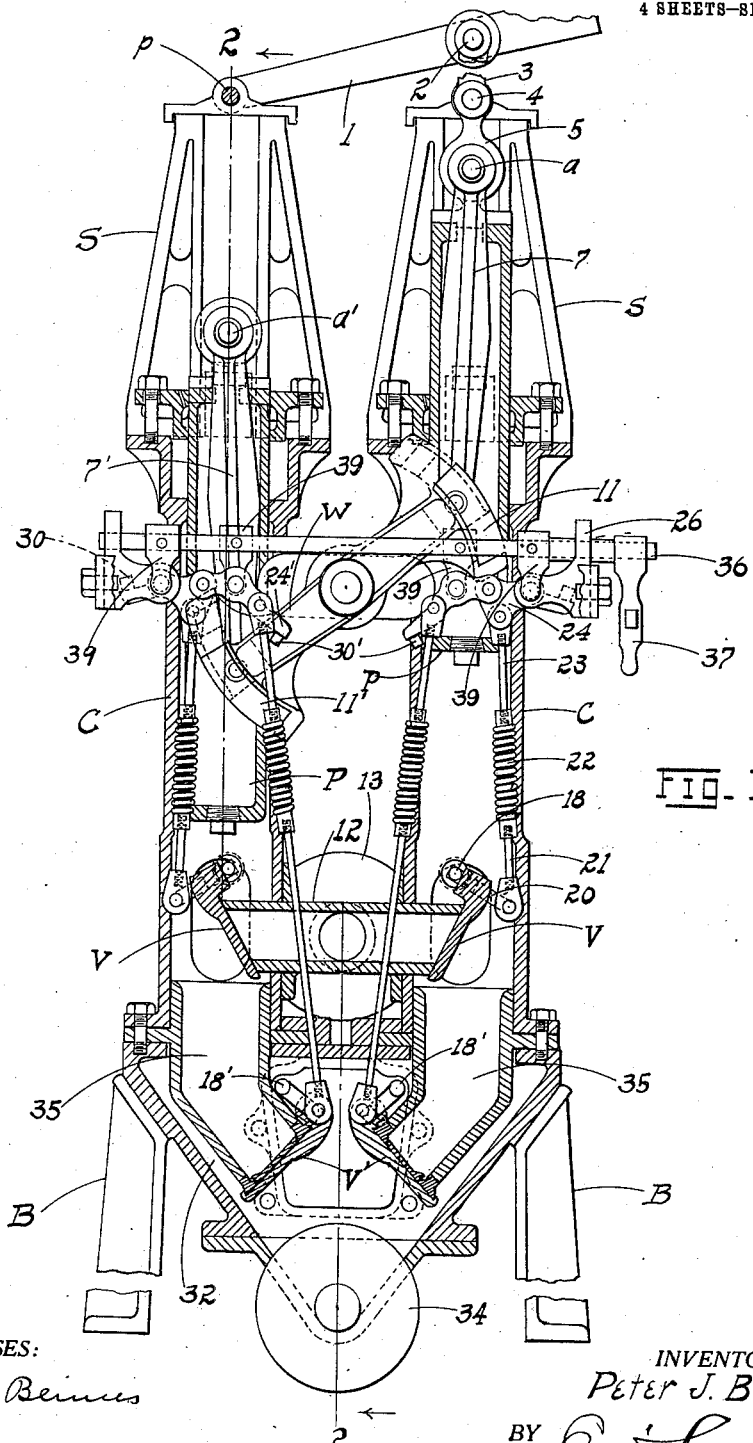

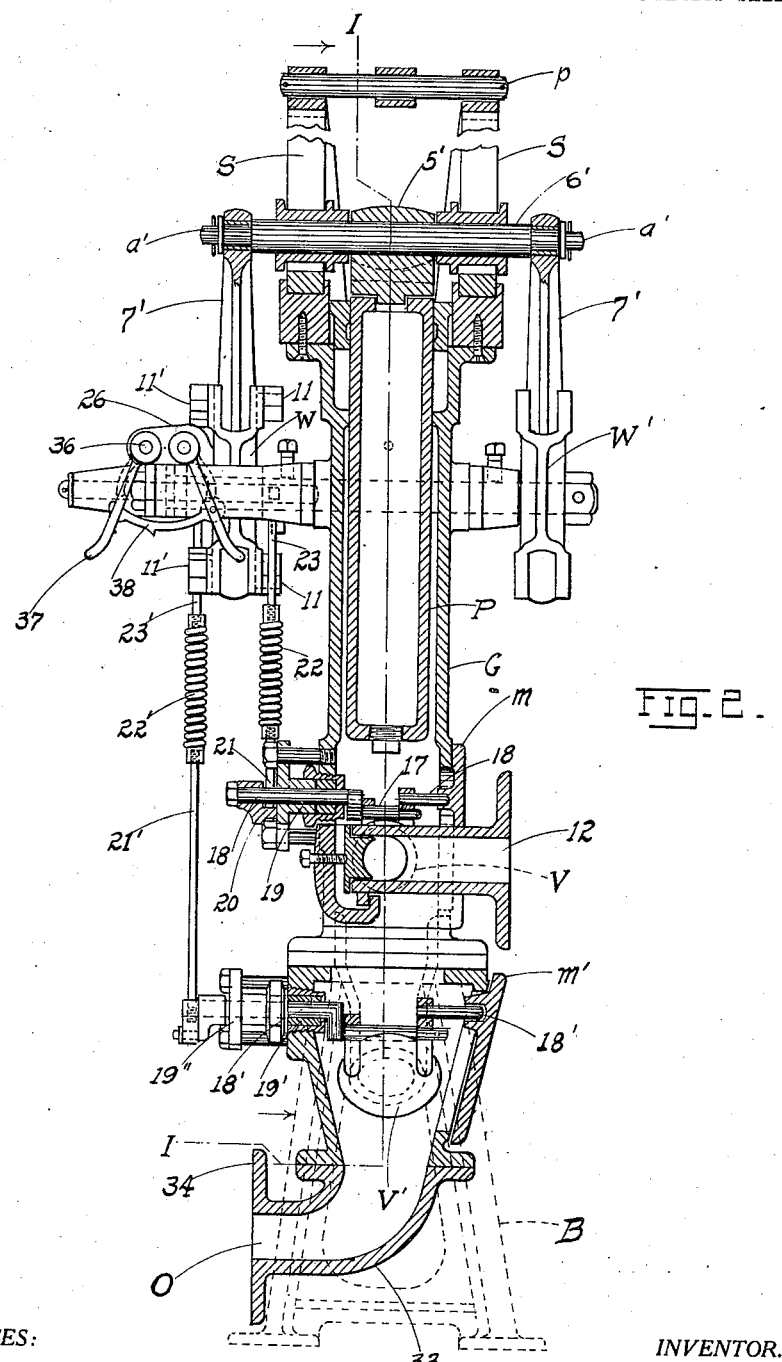

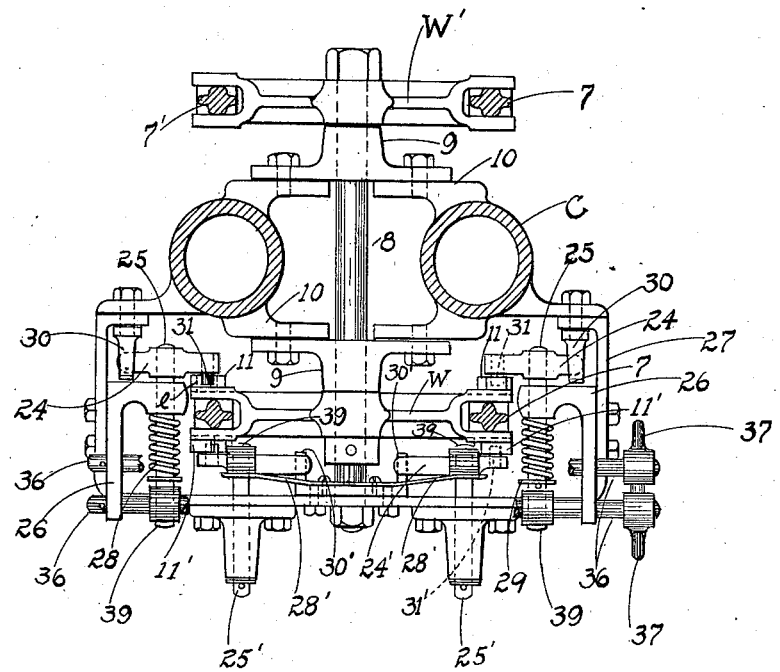

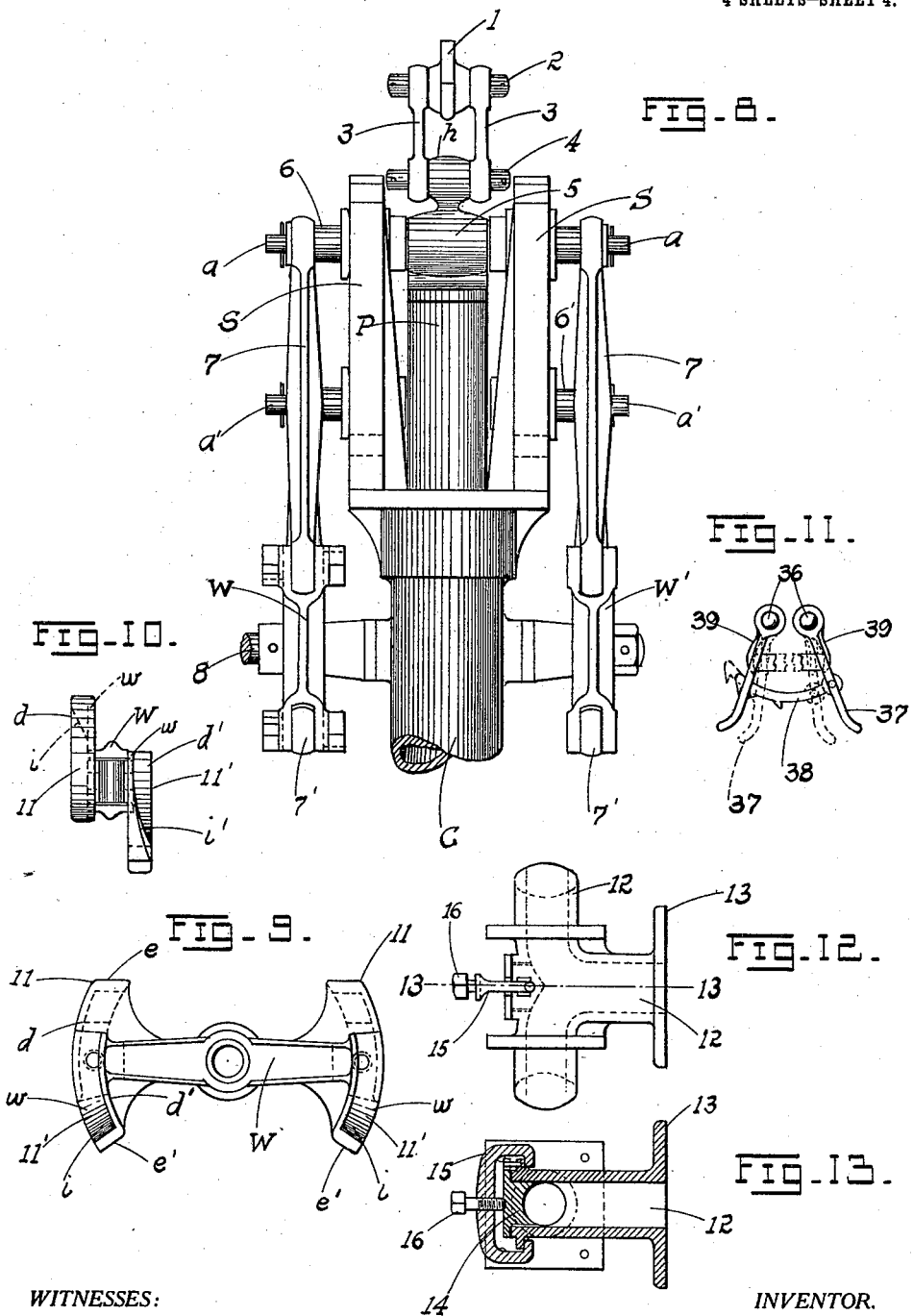

PETER J. BODE, OF ST. LOUIS, MISSOURI.

PUMP.

996,697. Specification of Letters Patent. Patented July 4, 1911.

Application filed November 14, 1908, Serial No. 462,640. Renewed January 13, 1911. Serial No. 602,478.

*To all whom it may concern:*

Be it known that I, PETER J. BODE, citizen of the United States, residing at St. Louis, State of Missouri, have invented certain new and useful Improvements in Pumps, of which the following is a full, clear, and exact description, reference being had to the accompanying drawings, forming a part hereof.

My invention has relation to improvements in pumps; and it consists in the novel construction and arrangement of parts more fully set forth in the specification and pointed out in the claims.

In the drawing, Figure 1 is a combined side elevation, and section on the line 1—1 of Fig. 2 of the invention; Fig. 2 is a combined elevation and section on the line 2—2 of Fig. 1; Fig. 3 is a top plan of the parts with the upper standards of the pump removed, and the pump-cylinders in cross-section; Figs. 4 and 5 are diagrammatic illustrations showing the manner of operation of the valve-actuating shoe or cam and the tappet which it directly engages; Figs. 6 and 7 are respectively an end, and combined side and sectional views of the stuffing box for the rock-shaft of the discharge-valve; Fig. 8 is a front elevation of the upper portion of the pump; Fig. 9 is a detached view of one of the oscillating walking-beams by which the tappets of the intake and discharge valves are actuated; Fig. 10 is an end view of Fig. 9; Fig. 11 is an end view of the rock-shafts carrying the arms by which the tappets are forced out of the path of the tripping shoes of the walking-beam; Fig. 12 is an elevation of the tee constituting the intake for the water or liquid to be pumped; and Fig. 13 is a section on the line 13—13 of Fig. 12.

The present invention has special application to pumps intended for operating on sandy and muddy water, although of course it may be used to pump any kind of water or liquid.

The objects sought are to produce a pump in which the intake and discharge valves may be actuated by mechanical connections interposed between the valves and pump piston, independently of the pressure of the currents controlled by said valves; one in which the valves may be swung to a full open position for a minimum travel of the piston or plunger; one in which the mechanical connections between the valves and piston may be thrown out of action or disconnected from the valves with a minimum loss of time, and through a comparatively simple manipulation of the controlling parts; one in which the discharge valve is carried by a removable chamber permitting ready replacing of the latter for purposes of repairs; one in which no material resistance is offered to the inflowing current; one in which the valve is ready to close at the proper moment so that no time is lost in such closing movement and hence all thumping and pounding is avoided; one in which no leakage is permitted by the valves; one in which the intake valve closes slowly while the water is still entering so that when ready to seat by the reversal of the plunger, it has a minimum distance to travel to reach its seat and hence closes without loss of time at the critical moment; one in which the tendency to clog the joints between the valves and their seats by accumulations of sand or dirt is reduced to a minimum, the dirt and sand-laden current always taking a direction to insure the mechanical removal of such suspended particles; one in which the liquid takes the most direct path through the pump on its way to the outlet or discharge end; and one possessing further and other advantages better apparent from a detailed description of the invention which is as follows:—

Referring to the drawings, B, represents the base on which the pump is mounted, the pump in the present instance being double acting and provided with two cylinders, C, C, and pistons P, P. Superposed above the cylinders are standards S, S. Pivoted at one end to a pin $p$ on one of the standards S, is an operating lever 1 carrying at an intermediate point thereof a pin 2 from which depend links 3, 3, whose lower ends are in turn pivotally coupled to a pin 4 carried by the head or lug $h$ projecting from the peripheral surface of the tubular casting or bearing 5 secured to the top of the adjacent piston P. The part 5 forms a bearing for the front cylindrical cross-bar 6 whose opposite ends terminate in reduced extensions or studs $a$, $a$ about which are pivotally swung the front pair of connecting rods 7, 7, (omitted from Fig. 2) the lower ends of which are pivotally coupled to the adjacent forked ends of the walking-beams W, W'. The walking-beams W, W' are mounted on a centrally disposed cross-shaft 8 (Fig. 3)

mounted in brackets 9, 9, secured to bracket arms 10, 10 formed on the cylinder walls. Coupled to the opposite or rear ends of the walking-beams are similar connecting rods 7', 7' whose upper ends are pivotally swung from the terminal studs $a'$, $a'$ of the rear cylindrical cross-bar 6' carried in the bearing 5' on top of the rear piston P. From the connections described it is obvious that as the lever 1 is oscillated up and down about its fulcrum $p$, the walking-beams W, W' will be oscillated about the axis of the shaft 8, and the pistons P, P, will be reciprocated alternately in opposite directions.

The opposite ends of one of the walking-beams, namely, the walking-beam W, are provided on opposite sides with shoes 11, 11', formed respectively with faces $d$, $d'$ curved in the arcs of oscillation of the beam, said faces terminating in heels $e$, $e'$ pointing in opposite directions. From the inner edge of each curved face ($d$, $d'$) extends a wall $w$ which is disposed in a plane parallel to the plane of oscillation of the beam, the outer edge of the heel ($e$, $e'$) being connected to the wall $w$ by the sloping formation or incline $i$. These shoes 11, 11' are made use of for tripping the tappets which control the opening of the intake and discharge valves as presently to be described. For the present however, I shall describe the valves referred to, and the connections between them and the tappets.

Entering the bottoms of the pump cylinders C, C, through the peripheral walls thereof, are the transverse branches or legs of an intake member or tee 12 to the flange 13 of whose outer leg may be coupled any supply pipe (not shown) leading to the source of water or liquid to be pumped. The free ends of the transverse branches are formed so as to incline inwardly and downwardly (Fig. 1) said ends being controlled by the intake valves V, V. At the junction of the transverse legs of the tee is a hand hole closed by a plug 14 whose inner face is beveled and curved so as to conform to the curvature of the inner walls of the legs, thus making a smooth surface along which dirt and sand can not lodge. The plug is held in place by a clamp 15 and screw 16, as well understood in the art (Figs. 12, 13). The valve V is provided with two ears (Fig. 2) through which passes the wrist-pin 17 and sections of the shaft 18 respectively, whereby the pin 17 is off-set a suitable distance from the axis of oscillation of the rock-shaft 18. In this way the valve will oscillate not about the axis of the wrist-pin, but about the axis of the shaft 18, and accordingly will sweep through a considerable arc for a slight rotation of the rock-shaft 18. This, coupled with the inclined mouth of the leg of the intake member 12 which said valve controls, permits the full opening of such mouth to be uncovered for a slight rotation of the shaft 18, which slight rotation imparts a considerable arc of oscillation to the valve. This is clearly obvious from an inspection of Fig. 1, where a slight oscillation or rocking of the shaft 18 will swing the valve V to full open position. The radius describing the arc which the free edge of the valve traverses corresponds to the hypotenuse of a triangle of which the valve may be considered the base, the perpendicular being represented by the offset between the shaft and the wrist-pin 17. One end of the shaft 18 passes through a stuffing-box 19, the projecting portion of such shaft-end being provided with a crank-arm 20 whose outer end is pivotally coupled to the terminal head of a link 21 at the lower end of the spring 22, the upper end of the spring terminating in a link 23 whose terminal head is pivotally connected to the adjacent arm of a tappet-lever 24. The lever 24 is carried at the inner end of a rock-stem 25 mounted in a bracket or member 26 bolted to the frame 27 projecting from the pump cylinders (Fig. 3), the stem having coiled thereon an expanding spring 28 which is interposed between the bracket and a collar 29 fixed on the stem. In this way the spring tends to draw the tappet-lever 24 toward the walking-beam W. The lever 24 is limited in its oscillation under the draft of the spring 22 (which is a contracting spring) by a lug or stop 30 by which the adjacent arm of the lever is arrested. The free end of the opposite arm of the lever 24 carries a finger or tappet 31 which for an upward oscillation of an arm of the walking-beam W is impinged by the wall $e$ of the shoe 11 by which impact the lever 24 is oscillated in a direction to pull on the link composed of the parts 21, 22, 23, whereby an upward oscillation is imparted to the crank-arm 20 and the valve V swung to open position. The spring 22 is interposed between the parts 21 and 23 to take up any sudden jar and prevent breaking of the parts in the event of a sudden impact against the tappet 31.

With the impact of the face $e$ of the shoe 11 against the tappet 31, of course a raising of the arm of the lever 24 to which said tappet is secured, results, and in this raising of such lever arm an opening of the valve V follows; but it may be well at this time to follow up the full sweep of the ascending arm of the walking-beam and see what follows:—This will be best understood by a reference to the diagrammatic views in Figs. 4 and 5. As the wall $e$ of the shoe 11 strikes the pin or tappet 31 it drives the tappet before it, oscillating the lever 24 about the axis of the stem 25, said pin describing a path defined by the circular line $x$ (Fig. 4). As the shoe continues its oscillation the pin 31 slips off the wall $e$ settling in the outer surface of the wall $d$ of the shoe (the valve V all this time remaining open, it having been oscillated to said open position by the tripping of the lever 24 to which the valve is connected through the parts 20, 21, 22, 23, and rockshaft 18) over which it rides until forced to slip off by a disengagement of the wall $d$ therefrom. As soon as the tappet pin has slipped off said wall $d$, the weight of the valve V supplemented by the pressure of the now descending piston P coupled to the walking-beam cause the valve to close and draw the lever 24 to its original position; but in such return, the pin 31 is now brought back into position to engage the opposite face of the wall $d$ along which it rides in the descending movement of the shoe (or downward oscillation of the arm of the walking-beam W), until it encounters the incline $i$, which incline forces the pin, and consequently the stem 25 inwardly against the action of the expanding spring 28, until the pin has slipped off the incline, whereupon the expanding action of the spring draws the stem back to its original position (left hand side Fig 3) so as to again bring the pin 31 directly over the terminal wall $e$ of the shoe, to be again engaged and tripped by the latter with the next ascending movement or upward oscillation thereof. It thus follows that with every upward oscillation of the walking-beam (the operation described applying to either end of the beam) the shoe 11 thereof strikes the tappet 31, rocking the stem 25 about its axis, the consequent oscillation imparted to the tappet-lever 24 drawing on the connecting rod composed of the sections 21, 22, 23, which in turn oscillate the crank-arm 20 which rocks the shaft 18 in proper direction to open the valve V. The pump being double acting, first one valve V is opened and then the other. The valve remains open until the pin 31 has slipped off the face $d$ by which time the walking-beam is ready to make its return stroke or oscillation, whereupon the pin 31 slips off the face $d$ allowing the valve to close by gravity. It is for the closed position of the valve that the tappet pin 31 engages the inner face of the wall $d$, and incline $i$ by which the pin is forced to the edge of the wall $e$ and allowed to automatically slip back over the wall $e$ for engagement therewith in the next stroke of the walking-beam.

With the downward oscillations of the walking-beam the discharge valves V' are opened, the action of the shoes 11' upon the tappet-pins 31' of their corresponding tappet-levers 24' and rock-stems 25' being exactly the same as that described in connection with the intake valves V, the only difference being that the wall $d'$ of the shoe 11' actuating the discharge valve forms the inner boundary of the shoe instead of the outer boundary (Fig. 9) this being necessary since the rock-stems 25' are located to one side of, and interior to the position occupied by the stems 25. The shoe 11' is provided with a terminal wall $e'$, an incline formation $i'$, all precisely the same as the shoe 11 which actuates the intake valve V. The tappet-levers are arrested in their oscillation by bracket arms or stops 30', and the connecting rod between the rock-shaft 18' of said valve is composed of sections 21', 22', 23', identical with the corresponding sections 21, 22, 23 of the intake valve V. Of course in the actual operation of the machine, the intake valve identified with one cylinder opens while the discharge valve identified with the opposite cylinder opens, the other intake and discharge valve closing. This is due to the fact that the ascending shoe at the end of one arm of the walking-beam is actuating the intake valve, while the descending shoe at the opposite end is actuating the discharge valve. The short ends of the rock-shafts 18, 18' are mounted in plates $m$, $m'$ located opposite suitable hand holes through which access may be had into the cylinders C, C, and discharge chamber 32. The chamber 32 is conical, having secured to the bottom thereof an elbow 33 provided with a flange 34 to which any conducting pipe (not shown) may be secured. The discharge valves V' are mounted similarly to the valves V as obvious from the drawings, except that the discharge ends of the basal angular extensions 35 leading from the cylinders C, C, incline downwardly and outwardly instead of downwardly and inwardly as is the case with the intake ends of the legs of the tee 12. This however, is due to the fact that the discharge legs of the extensions 35 converge toward the center of the chamber 32 instead of diverging as do the legs of the tee 12; so that the results insofar as securing a full opening of the valves V' with a slight rotation of the rock-shafts 18' are the same. As shown (Fig. 1) the discharge legs of the extensions 35 are directed toward the outlet O of the chamber 32 so that a ready discharge of the water and sand can take place, the flow being directed toward such outlet by the converging walls of the discharge chamber.

In the case of the rock-stems 25' identified with the discharge valves V', the tappet pins 31' carried by the tappet-levers 24' of such stems, are forced inwardly into the paths of oscillation of the shoes 11' by spring arms 28' (instead of coiled springs such as 28) said spring 28' being secured to the bracket of which the lugs 30' form a part (Fig. 3), the free ends of the spring arms bearing against the levers 24' at points directly above the stems 25'. Thus the springs 28, 28' serve to force the stems 25, 25' in proper direction to bring their tappet-pins 31, 31' in proper position to be struck by the shoes 11, 11' in the oscillations of the walking-beam W, and thereby open the respective valves V, V' for the purposes indicated. The opening of the valves through the mechanical connections as described is desirable or necessary however only in cases where the water is so charged with dirt and sand as to make its flow so sluggish and impotent as to be ineffective for opening the valves by the natural current or flow induced under the reciprocating actions of the pistons. Where however, the water is practically free of dirt and sand so that the force of its flow is not impeded in responding to the movements of the pistons, the mechanical opening of the valves need not be resorted to, and the valves are left to open under the pressure of the fluid current alone. It becomes necessary therefore under those circumstances to force the tappet pins 31, 31' out of the range of oscillation of the shoes 11, 11', and for this purpose the following mechanism is availed of:—Mounted in the frame members 26, in a plane slightly above the axes of oscillation of the stems 25, 25' are a pair of rock-shafts 36, 36, one end of which is provided with hand-levers 37, 37. Pivotally secured at one end to one of said levers is a gravity pawl 38 having teeth disposed along its bottom edge, the body of the pawl passing freely through an opening in the opposite lever 37 (Figs. 2, 11). Disposed in proper positions along the shafts 36, are depending arms or grippers 39, the positions of these arms being such as to come directly in front of the stems 25, 25', so that when the levers 37, 37 are seized by the operator and swung toward each other, the pairs of arms or grippers 39, 39 will oscillate toward each other, those on one shaft forcing the stems 25 inwardly, and those on the other shaft driving the stems 25' outwardly against the resiliency of the respective springs 28, 28', thus forcing the stems referred to far enough from their normal position as to push the tappet pins 31, 31' out of the paths of oscillation of the shoes 11, 11' of the walking-beam. Of course, when the levers 37, 37 are thus drawn or squeezed together the teeth of the gravitating pawl 38 will engage the outer edge of the opening in the lever through which the pawl is free to pass, and thus automatically lock the levers at the particular tooth which happens to have passed through the opening, (see dotted position Fig. 11). With the tappet-pins 31, 31' thus temporarily held out of the path of oscillation of the walking-beam, the valves V, V' are left to open under the pressure of the current induced as a result of the reciprocations of the pistons driven by the operating lever 1. Of course when the pawl 38 is lifted sufficiently to disengage the levers, the shafts 36, are free to rock back to original position under the pressure of the springs exerted against the gripping arms 39.

In Figs. 6, 7, I show a stuffing-box 19' with its follower 19" for the shaft of the discharge-valve, being on the order of the stuffing-box and follower for the shaft of the intake valve, but this detail, as well as many others shown on the drawings and not referred to, are well known and form no part of the present invention.

The operation of the pump has been sufficiently detailed without reviewing the same at this point. Suffice it to say however, that the pins 31, 31' slip off their riding faces $d$, $d'$ of their respective tripping shoes 11, 11', so as to be released somewhat before the end of the piston stroke. This permits the valve to be released somewhat before the end of the stroke, and may be returned to a position close to its seat as it is now only held open by the flow of the water past it. So that when the piston actually begins its return stroke the valve may be instantly forced against its seat thus reducing the valve leakage to a minimum. Again, by the downward dip assumed by the valves, any dirt which may tend to lodge between the valve and its seat is automatically washed and drained, so that no foreign matter may effectively lodge on the valve seat, and here again the leakage is reduced to a minimum.

Having described my invention, what I claim is:—

1. In a pump, the combination with a cylinder, a piston therefor, an intake-valve, connections independent of the pressure of the fluid pumped for operating said valve, and means for disengaging said connections whereby said valve may be actuated by the pressure of the fluid alone.

2. In a pump, the combination with a cylinder, a piston therefor, an intake-valve, connections independent of the pressure of the fluid pumped interposed between the valve and piston for operating said valve, and means for disengaging said connections whereby said valve may be actuated by the pressure of the fluid alone.

3. In a pump, the combination with a cylinder, a piston therefor, a discharge-valve, connections independent of the pressure of the fluid pumped for operating said valve, and means for disengaging said connections whereby said valve may be actuated by the pressure of the fluid alone.

4. In a pump, the combination with a cylinder, a piston therefor, an intake-valve, a member coupled to the piston, and detachable connections mounted in movable relation to said member and coöperating therewith for one position to actuate the valve independently of the pressure of the fluid pumped.

5. In a pump, the combination with a cylinder, a piston therefor, an intake-valve, a member coupled to the piston, connections mounted in movable relation to said member and coöperating therewith for one position to actuate the valve independently of the pressure of the fluid pumped, and means for shifting said connections out of coöperating position with said member whereby the valve may be actuated by the pressure of the fluid alone.

6. In a pump, the combination with a cylinder, a piston therefor, a valve for controlling the fluid to be pumped, a member coupled to the piston, and detachable connections mounted in movable relation to said member and coöperating therewith for one position to actuate the valve independently of the pressure of the fluid pumped.

7. In a pump, the combination with a cylinder, a piston therefor, a valve for controlling the fluid to be pumped, a member coupled to the piston, and connections mounted in movable relation to said member and coöperating therewith for one position to actuate the valve independently of the pressure of the fluid pumped, and allowing the pressure of the fluid alone to actuate the valve for another position of said connections.

8. In a pump, the combination with a cylinder, a piston therefor, a walking-beam coupled to the piston, a valve for controlling the fluid to be pumped, and connections mounted in movable relation to the walking-beam and coöperating therewith for one position to actuate the valve independently of the pressure of the fluid pumped, and means for shifting the connections aforesaid out of coöperation with the walking-beam whereby the valve is free to be controlled by the pressure of the fluid alone.

9. In a pump, the combination with a cylinder, a piston therefor, a walking-beam coupled to the piston, a valve for controlling the fluid to be pumped, a tappet mounted in movable relation to the path of oscillation of the walking-beam and coöperating therewith for one position, intermediate connections between the tappet and valve whereby the latter may be actuated by the walking-beam independently of the pressure of the fluid pumped, and means for shifting the tappet out of the path of movement of the walking-beam, whereby the valve is left under the control of the fluid pressure alone.

10. In a pump, the combination with a cylinder, a piston therefor, a walking-beam coupled to the piston, an oscillating valve for controlling the fluid to be pumped, a rocking tappet-lever, a connecting rod interposed between the tappet-lever and valve, a tappet-pin on the tappet-lever, a longitudinally movable rock-stem secured to the tappet-lever and adapted for one position to maintain the tappet-pin in the path of oscillation of the walking-beam whereby a movement of the beam in one direction effects control of the valve independently of the pressure of the fluid pumped, and means for shifting the rock-stem and tappet-pin to a position to bring the pin out of the path of movement of the walking-beam.

11. In a pump, the combination with a cylinder, a piston therefor, a walking-beam coupled to the piston, a valve for controlling the fluid to be pumped, a spring-controlled rocking-stem capable of longitudinal movement, a tappet-lever on the stem, a tappet-pin on the lever, intermediate connections between the lever and valve, a shoe on the walking-beam adapted to impinge against the pin for an oscillation in one direction and oscillate the tappet-lever and thereby actuate the valve, then releasing the pin so impinged, and suitable formations on the shoe for preventing impact against the pin with the return stroke of the walking-beam, but engaging the pin to shift the longitudinally movable stem the required degree to restore the pin to its proper position to be impinged by the shoe on the next stroke of the walking-beam, whereby with each stroke of the walking-beam in a given direction, the valve is actuated independently of the pressure of the fluid to be pumped.

12. In a pump, the combination with a cylinder, a piston therefor, a valve for controlling the fluid to be pumped, a walking-beam oscillating in conjunction with the reciprocations of the piston, a longitudinally-yielding spring-controlled rocking-stem, a tappet-lever on said stem, a tappet-pin on the lever, intermediate connections between the lever and valve, a shoe on the walking-beam having a terminal face for impinging against the tappet-pin with an oscillation of the beam in one direction, and having a curved wall for the travel of the pin along one face thereof during such oscillation, the pin traveling freely along the opposite face of said curved wall with the oscillation of the beam in the opposite direction, said shoe having an incline formation on the side of such opposite face leading to the edge of the terminal impinging wall, whereby the pin riding along said incline is forced to the edge of the impinging wall, the spring controlling the longitudinally movable rock-stem, drawing the stem in proper direction upon the release of the pin from said incline formation to bring the tappet-pin to its original position to be again impinged by the shoe with the next stroke of the walking-beam, whereby with every stroke of the piston in a given direction, the valve is actuated without regard to the fluid pressure.

13. In a pump, a walking-beam terminating in a shoe having a wall curved in the arc of oscillation of the beam, a terminal wall for one end of the curved wall, and an incline or wedge formation connecting the end of the terminal wall with the adjacent face of the curved wall, as set forth.

14. In a pump, the combination with a pair of spring-controlled longitudinally-movable rock-stems, tappet-levers carried thereby, tappet-pins on said levers, a pump cylinder, a piston therefor, intake and discharge valves connected to the respective tappet-levers, an oscillating walking-beam for engaging the tappet-pins, a pair of rock-shafts mounted in proximity to the rock-stems, gripping arms on the rock-shafts for engaging the stems, and pawl-controlled levers on the rock-shafts for rotating the latter in a direction to force the gripping arms against the rock-stems and force the pins out of the path of impact with the walking-beam.

15. In a pump, a pair of cylinders terminating in discharge-chambers converging toward a common outlet, an intake member terminating in each cylinder in a downwardly inclined discharge mouth, and a valve controlling said mouth, and oscillating about an axis located outside of said member and off-set a suitable distance from the body of the valve, whereby the full opening of the mouth is uncovered with a minimum degree of oscillation of the shaft about which the valve oscillates.

16. In a pump, a pair of cylinders terminating in a discharge-chamber having downwardly converging walls, an intake tee having branches terminating in downwardly and inwardly inclined valve-seats, the cylinders having extensions terminating within the discharge-chamber in downwardly and outwardly inclined valve-seats, for the purpose set forth.

In testimony whereof I affix my signature, in presence of two witnesses.

PETER J. BODE.

Witnesses:
EMIL STAREK,
T. EVANS.

Copies of this patent may be obtained for five cents each, by addressing the "Commissioner of Patents, Washington, D. C."